2 Sheets—Sheet 2.

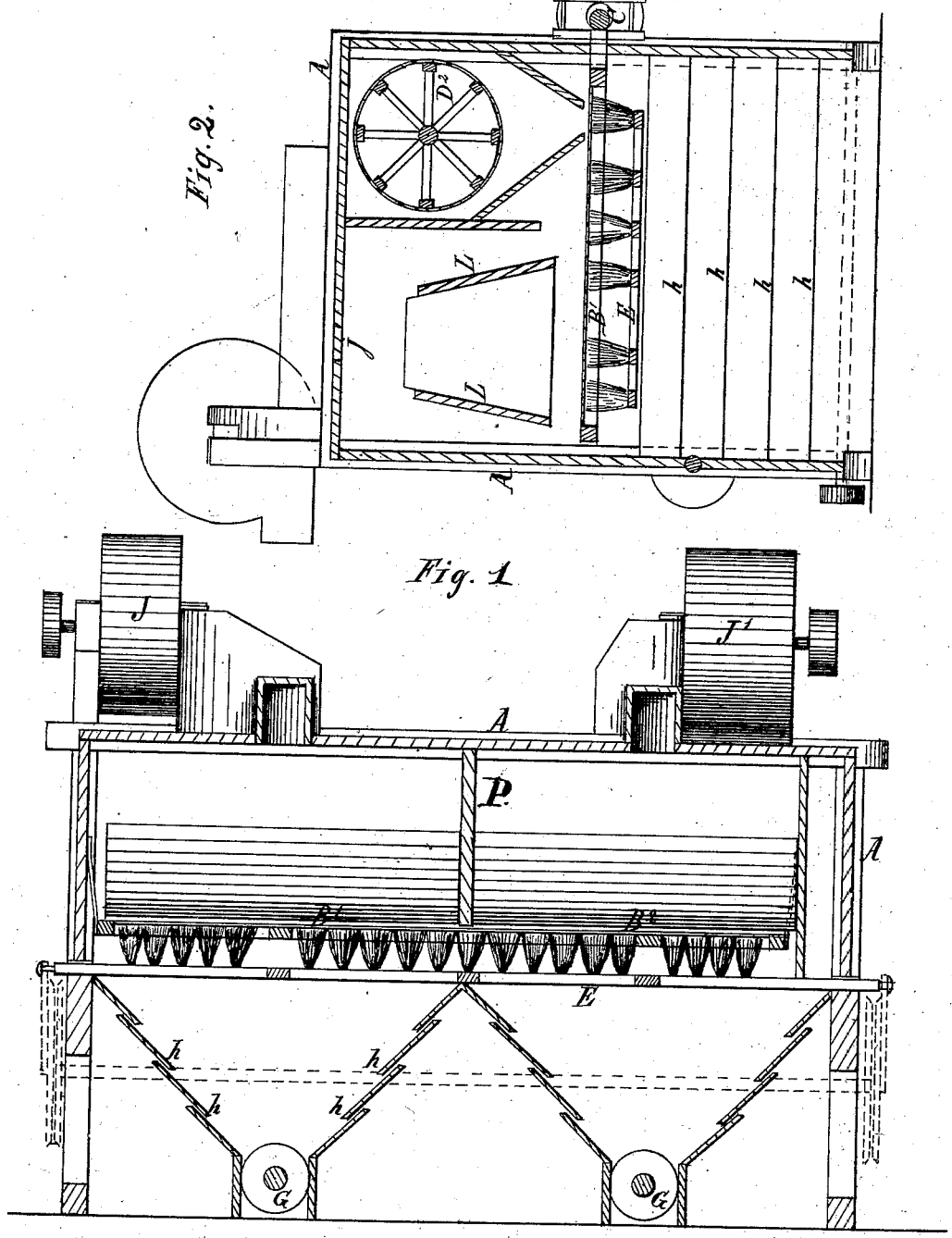

G. T. SMITH.
MIDDLINGS-SEPARATORS.

No. 194,539. Patented Aug. 28, 1877.

Witnesses:

Inventor:
George T. Smith
by H. H. Doubleday atty

UNITED STATES PATENT OFFICE.

GEORGE T. SMITH, OF WASHINGTON, DISTRICT OF COLUMBIA.

IMPROVEMENT IN MIDDLINGS-SEPARATORS.

Specification forming part of Letters Patent No. 194,539, dated August 28, 1877; application filed September 8, 1874.

*To all whom it may concern:*

Be it known that I, GEORGE T. SMITH, of Washington, in the county of Washington and District of Columbia, have invented certain new and useful Improvements in Middlings-Purifiers; and I do hereby declare that the following is a full, clear, and exact description thereof, which will enable others skilled in the art to which it pertains to make and use the same, reference being had to the accompanying drawings, and to the letters of reference marked thereon, which form a part of this specification.

Figure 4:
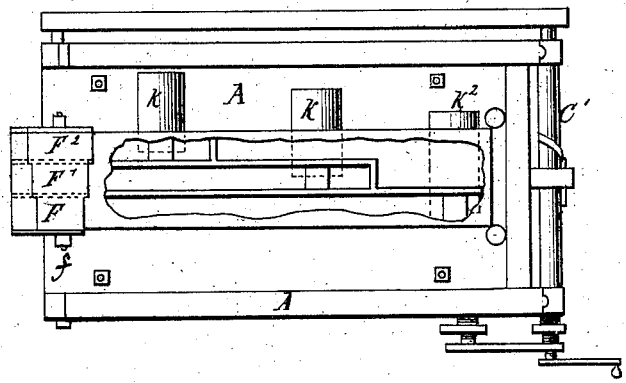
Figure 5:
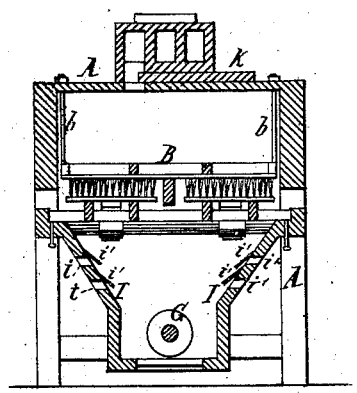
Figure 3:
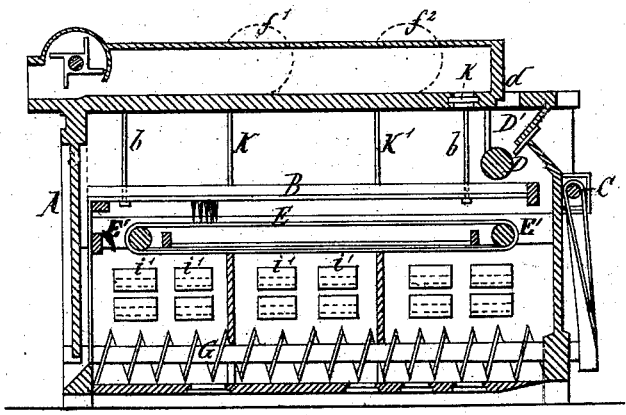

Figure 1 is a vertical sectional view taken transversely of the shaker. Fig. 2 is a vertical sectional view taken longitudinally of the shaker. Fig. 3 is a vertical longitudinal section of another form of machine embodying a part of the improvement shown in Figs. 1 and 2. Fig. 4 is a plan or top view of the machine shown in Fig. 3; and Fig. 5 is a vertical transverse section of the same machine.

A represents the frame-work and inclosing-case. B, in Figs. 3 and 5, and $B^1$ $B^2$, in Figs. 1 and 2, indicate the shaker suspended upon straps or links $b$, and reciprocated by means of a cam, C, on shaft $C'$. D is a feed-roller, arranged in a hopper, $D^1$, into which the middlings are delivered through a throat, $d$. (See Fig. 3.)

In the machine represented by Figs. 1 and 2, the middlings are first fed into a grading-reel, $D^2$, the finer portion being delivered upon the bolting-cloth of $B^1$ from the head of the reel, another coarser portion from the lower part of the reel falling upon the bolting-cloth of $B^2$, which is coarser than the cloth on $B^1$. As the division of the shaker into longitudinal sections having fine and coarse cloth, and the combination therewith of a grading-reel, form the subject-matter of an earlier application filed by me, they need not be further described here.

E are brushes employed to keep the bolt-cloth clean. They may be operated by endless chains driven by rollers $E^1$, as in Fig. 3, or by means of a crank and pitman, or by other approved mechanism, as will be readily understood. Below the shaker are gather-boards I to collect the material which falls through the shaker, and deliver it to the conveyer G, one such conveyer being shown in Figs. 3 and 5, and two in Fig. 1.

The space inclosed within the case or shell, and above the shaker, is divided into air-chambers, two being shown in Fig. 1, and three in Fig. 3. In the latter machine the partitions K K' are arranged transversely to the shaker, and extend from side to side of the machine, while in the machine represented in Figs. 1 and 2 the partition P is arranged lengthwise of the shaker to correspond with the longitudinal division between the reciprocating bolting-surfaces. Air-currents are passed upward through the reciprocating bolt-cloth to assist in purifying the middlings, and to produce these currents I employ two or more fans.

In the machine represented by Figs. 1 and 2, I propose to employ two fans, J J', each provided with an air-trunk, and each fan drawing the air only through its own trunk, and from such portion of the bolting-surface as its trunk may communicate with.

In the machine represented by Figs. 3, 4, and 5 I have shown two modes in which fans may be employed in combination with reciprocating bolting-surfaces, in such manner that each fan shall, independently of the other fan or fans, cause or produce an air-current through a certain portion of the bolting-cloth.

In Fig. 4, F $F^1$ $F^2$ represent three suction-fans of different sizes, mounted upon and driven by a shaft, $f$, each fan communicating with a part of the bolting-surface through its own air-trunk.

In Fig. 3, I have represented three fans of uniform size, as in full lines at F, and in dotted lines at $f^1$ and $f^2$. With this last arrangement the fans represented by dotted lines should communicate with the air-chambers in rear of each of them, respectively, the fan F in full lines drawing the air through the chamber next to the head of the machine.

From the above description it will be seen that by the employment of two (or more) fans, the fan-case of each being unconnected with that of the other or others, I can produce some desirable results—as, for instance, I can create a strong draft of air through a certain part of the bolting-cloth, and a light draft through another portion, by using fans which vary in their capacity relative to the size of the cloth and chamber through which they act, and the material which is drawn by each fan from the middlings may be collected separately, thus enabling the operator to judge more accurately of the character and progress of the work than he could if there was a direct connection between the fan-cases, so that one fan might draw a part of the air and this material away from the other fan, or through an air-trunk common to both fans, or if both fans discharged their blast through one and the same outlet.

In order to admit the air freely to the central portion of the shaker, so that the draft may be equal throughout the entire width of the cloth at any given point, instead of being strongest at the sides of the shaker, I have provided the gather-boards I, which form the conveyer-case, with openings, two forms of which are shown in the drawings; and to effectually guard against the escape and waste of middlings at these points I prefer that each opening shall have an overlapping surface above it, over which the middlings can slide, as shown at $i$ $i'$, Figs. 3 and 5, where $i$ are holes cut in the gather-boards with shields or guards $i'$ above them; also, in Figs. 1 and 2, where the openings extend the entire length of the case, as at $h$. The middlings are fed to the reciprocating shaker by means of either the feed-roller D or the reel-bolt $D^2$, and as they pass over the shaker in a thin sheet they are purified by the joint operation of the bolt-cloth and the air-currents, as will be readily understood, by those familiar with this class of machine, without further explanation.

What I claim is—

The combination, with the bolting-surface in a middlings-purifier, of two fans in fan-cases, which do not communicate with each other, each fan operating to produce independent air-currents in separate and distinct compartments, and through different sections of the reciprocating bolting-cloth, substantially as set forth.

In testimony that I claim the foregoing as my own I have affixed my signature in presence of two witnesses.

GEORGE T. SMITH.

Witnesses:
  H. B. WATERMAN,
  PRUSIA ALLEN.